(12) United States Patent
Bibolet et al.

(10) Patent No.: US 9,244,738 B2
(45) Date of Patent: Jan. 26, 2016

(54) CONDITIONAL SERIALIZATION TO IMPROVE WORK EFFORT

(71) Applicant: International Business Machines Corporation, Armonk, NY (US)

(72) Inventors: Richard A. Bibolet, Pleasant Valley, NY (US); Scott B. Compton, Hyde Park, NY (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/062,203

(22) Filed: Oct. 24, 2013

(65) Prior Publication Data

US 2015/0121390 A1    Apr. 30, 2015

(51) Int. Cl.
*G06F 9/46*    (2006.01)
*G06F 9/50*    (2006.01)

(52) U.S. Cl.
CPC .................................. *G06F 9/5038* (2013.01)

(58) Field of Classification Search
None
See application file for complete search history.

(56) References Cited

U.S. PATENT DOCUMENTS

| 6,108,689 | A  | * | 8/2000 | Fagen et al. ................ 709/206 |
| 6,112,222 | A  |   | 8/2000 | Govindaraju et al. |
| 6,850,938 | B1 | * | 2/2005 | Sadjadi |
| 7,428,539 | B2 |   | 9/2008 | Clift et al. |
| 7,577,798 | B1 |   | 8/2009 | Moir et al. |
| 8,392,388 | B2 |   | 3/2013 | Pasupuleti et al. |
| 2007/0169123 | A1 |   | 7/2007 | Hopkins |
| 2010/0100889 | A1 |   | 4/2010 | Labrie et al. |

FOREIGN PATENT DOCUMENTS

EP    0817015 A2    1/1998

* cited by examiner

*Primary Examiner* — Gregory A Kessler
(74) *Attorney, Agent, or Firm* — Cantor Colburn LLP; William A. Kinnaman, Jr.

(57) ABSTRACT

In some embodiments of this disclosure, a computer-implemented method includes requesting, by a first thread on a computer system, conditional exclusive access to a first resource for updating the first resource to perform a first task. An indication is received that the requested exclusive access to the first resource is currently unavailable. Unconditional shared access to the first resource is requested after receiving the indication that the requested exclusive access is unavailable. The shared access to the first resource is received. The first resource is used, by a computer processor, through the shared access to perform the first task in lieu of the requested exclusive access.

17 Claims, 3 Drawing Sheets

CONDITIONAL SERIALIZATION TO IMPROVE WORK EFFORT

BACKGROUND

Various embodiments of this disclosure relate to serialization and, more particularly, to conditional serialization for reducing unnecessary repetition of work.

In a multi-tasking computing environment, serialization is a technique that enables various threads to access shared resources while preventing corruption of those resources through simultaneous access. Serialization can be performed through the use of, for example, locks, latches, and enqueues (ENQs), which can enable a thread to maintain exclusive access in some form. After exclusive access to a resource is granted to a particular thread, the desired work can be performed without other threads corrupting the resource.

A side effect of serialization is that, in some instances, multiple threads may request that the same work be performed related to a particular resource. Due to the serialization, this work is then performed repeatedly in a single-threaded manner, as each thread gains its exclusive access and then proceeds to perform its work. As a result, the computing environment may expend more effort than necessary to perform the work requested by the various threads desiring access to the resource.

For example, several threads may wish to access a telephone directory. For some types of access, such as writing or creating, exclusive access may be desired so as to prevent data corruption. Thus, each thread must assure that the telephone directory has actually be created, and must then gain exclusive access to that directory, preventing other threads from attempting access for the purposes of reading, creating, or updating the directory until the exclusive access is complete.

SUMMARY

In one embodiment of this disclosure, a computer-implemented method includes requesting, by a first thread on a computer system, conditional exclusive access to a first resource for updating the first resource to perform a first task. An indication is received that the requested exclusive access to the first resource is currently unavailable. Unconditional shared access to the first resource is requested after receiving the indication that the requested exclusive access is unavailable. The shared access to the first resource is received. The first resource is used, by a computer processor, through the shared access to perform the first task in lieu of the requested exclusive access.

In another embodiment, a system includes a first thread and an access manager. The first thread is configured to request conditional exclusive access to a first resource for updating the first resource to perform a first task. The access manager is configured to indicate to the first thread that the requested exclusive access to the first resource is currently unavailable. The first thread is further configured to request unconditional shared access to the first resource after receiving the indication that the requested exclusive access is unavailable; receive the shared access to the first resource; and use the first resource through the shared access to perform the first task in lieu of the requested exclusive access.

In yet another embodiment, a computer program product includes a computer readable storage medium having computer readable program code embodied thereon. The computer readable program code is executable by a processor to perform a method. The method includes requesting, by a first thread on a computer system, conditional exclusive access to a first resource for updating the first resource to perform a first task. Further according to the method, an indication is received that the requested exclusive access to the first resource is currently unavailable. Unconditional shared access to the first resource is requested after receiving the indication that the requested exclusive access is unavailable. The shared access to the first resource is received. The first resource is used through the shared access to perform the first task in lieu of the requested exclusive access.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are serialization systems and methods, enabling threads to access shared resources in a multi-tasking system. In some embodiments, serialization is granted conditionally, thus reducing the amount of work effort expended by the various threads.

Figure 1:
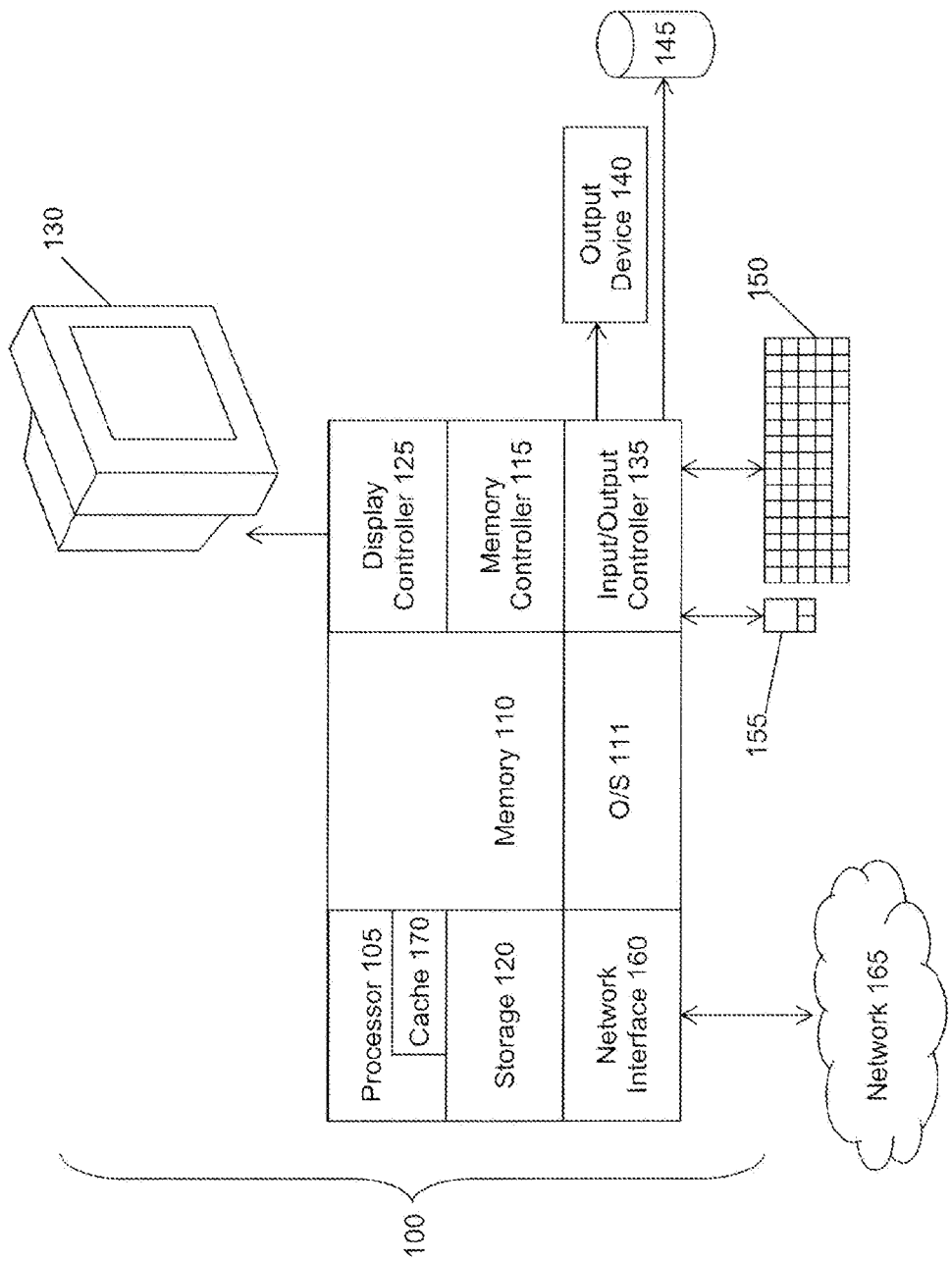
FIG. 1 is a block diagram of a computer system for use in implementing a serialization system or method, according to some embodiments of this disclosure.

FIG. 1 is a block diagram of a computer system 100 for use in implementing a serialization system or method according to some embodiments. The serialization systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. A conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the serialization systems and methods of this disclosure.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Serialization systems and methods according to this disclosure may be embodied, in whole or in part, in computer program products or in computer systems 100, such as that illustrated in FIG. 1.

Figure 2:
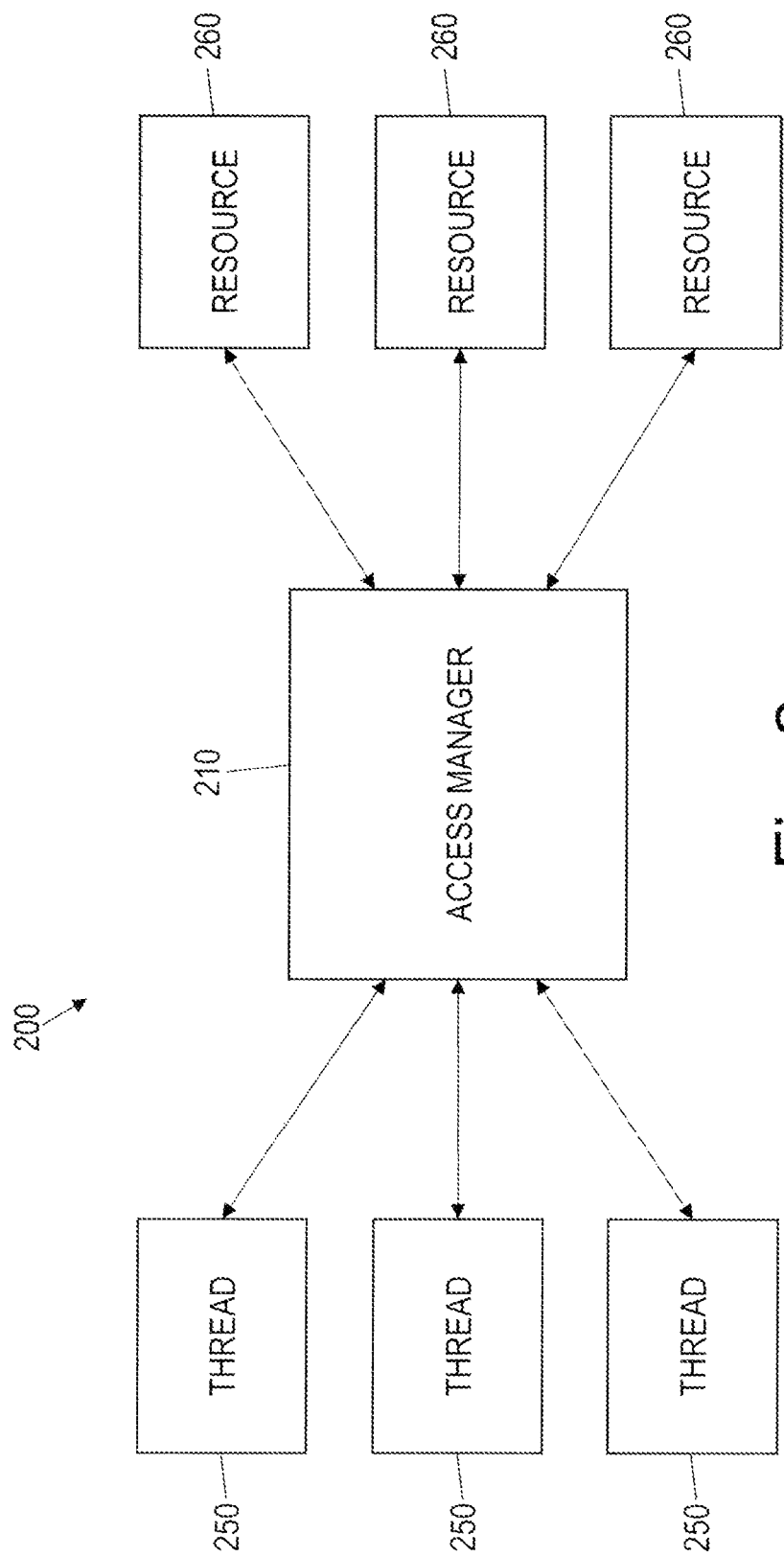
FIG. 2 is a block diagram of a serialization system, according to some embodiments of this disclosure.

FIG. 2 is a block diagram of a serialization system 200, according to some embodiments of this disclosure. As shown, the serialization system 200 may include an access manager 210, two or more threads 250, and one or more resources 260. The access manager 210 may include hardware, software, or a combination of both and may be embodied, in whole or in part, in one or more computer systems 100. The access manager 210 may be in communication with the threads 250 and may be configured to access one or more resources 260. Each resource 260 may be operable on by at least one of the threads 250, which may update the resources 260 or otherwise use or modify them. Each resource 260 may be, for example, a set of data. Generally, the threads 250 may require access to the resources 260 to perform one or more tasks assigned to the threads 250, where such tasks are based on the resources 260.

In some embodiments, the threads 250 may occasionally require exclusive access to a resource 260. Such access may be required, for example, when writing to the resource 260 or creating the resource 260, so as to avoid multiple threads 250 simultaneously writing to the same resource 260, which would corrupt the resource 260, thereby causing threads 250 to fail or return incorrect data.

When a thread 250 desires access to a resource 260, the access manager 210 may receive a request for such access. The request may indicate the resource 260 desired to be accessed and may include data, if applicable, further indicating how the thread 250 intends to use the requested resource 260. The request may reach the access manager 210 in various ways. For example, the thread 250 may acquire an exclusive enqueue for the resource 250; the thread 250 may transmit the request to the access manager 210; or the thread 250 may transmit the request to whatever component of an applicable computer system 100 generally handles such requests, in which case the access manager 210 may intercept that request. It will be understood that the manner of the access manager's receiving the request for the resource 260 may be implementation dependent.

In some embodiments, the serialization system 200 may be directed toward handing resource requests that require a resource 260 to be accessed exclusively by a single thread 250, or locked. For requests that may be conventionally fulfilled via shared access, the access manager 210 may simply assure that no other thread 250 already has the resource 260 exclusively and may then provide the requested access. If, however, the resource 260 is already held exclusively by a first thread 250 when a second thread 250 requests exclusive access, the second thread 250 may become a waiting thread 250. As discussed further below, waiting threads 250 may gain shared access to the resource 260.

For each resource 260, the access manager 210 may maintain resource data, describing the current status of that resource 260. The resource data may indicate, for example, whether the resource is currently being held, either shared or exclusively, and which threads 250 are waiting to access the resource 260. When handling access requests for the various resources 260, the access manager 210 may utilize and update the resource data as needed.

When a request for a particular resource 260 is received, the access manager 210 may determine whether the resource 260 is currently held, either exclusively or shared. If the resource 260 is not currently held exclusively or shared, the access manager 210 may lock the resource 260 and may provide the requested exclusive access to the requesting thread 250. The thread 250 may then perform work on the resource 260, which may include updating the resource 260 to ensure that the most recently available data related to the resource 260 is used. When the thread 250 has finished its work with the resource 260, the resource 260 may be released by the thread 250 or by the access manager 260, depending on implementation. In some embodiments, the access manager 210 may update the resource data associated with the resource 260 to indicate the time the resource 260 was updated by the thread 250.

In some instances, a second thread 250 may request exclusive access to a resource 260, when that resource 260 is already being held by a first thread 250. In that case, the access manager 210 may determine that the resource 260 is already being held, and may also determine whether that holding is shared or exclusive. This determination may be made by checking the resource data or other suitable source of such information. When that determination is made, the access manager 210 may indicate to the second thread that the resource 260 is not currently available for exclusive access.

If the resource 260 is currently being held shared, in which case the resource 260 in not currently being updated, the second thread 250 may wait for the exclusive access it initially requested. When the resource 260 is released and the exclusive access is granted, the second thread 250 may then update the resource 260 and perform whatever task it intends with the resource 260.

On the other hand, if the resource 260 is currently being held exclusively, when the second thread 250 requests exclusive access, the access manager 210 may notify the second thread 250 that another thread 250 currently has exclusive access. Upon receiving this indication, the second thread 250 may opt to receive shared access instead. To this end, in some embodiments, such as those on IBM z/OS, the second thread 250 may obtain a shared enqueue (i.e., request for shared access). The shared enqueue may be obtained by the thread 250 in various ways, such as, for example, by converting its current exclusive enqueue to a shared enqueue or by releasing the exclusive enqueue and acquiring a shared enqueue instead. In some embodiments, the access manager 210 may manage the waiting threads 250, in which case the access manager 210 may add the second thread 250 to a list of threads awaiting the resource 260. This list may be stored, for example, in the resource data.

When the resource 260 is released by the first thread 250 that had exclusive access, shared access may then be provided to the second thread 250 and, if applicable, other threads 250 awaiting shared access. If waiting threads 250 acquired shared enqueues, such waiting threads may then receive the requested shared access. In the cases where the access manager 210 controls access, the access manager 210 may then allow the waiting threads 250 to obtain shared access to the resource 260. Because the threads 250 that waited were refused exclusive access due to exclusive access by another thread 250, they may be aware that the resource 260 was just updated by that other thread 250 and need not attempt to perform an additional update. It need not be necessary for a previously waiting thread 250 to update the resource 260, as the resource 260 was recently updated by the thread 250 that had locked the resource 260. For instance, if the resource 260 is an employee directory, where threads 250 are issuing search requests to locate employees, such requests generally require the resource 260 to be updated from time to time if they are to be made against current data. However, since new employees are not likely to be added multiple times per day, the resource 260 need not be updated for back-to-back requests.

Accordingly, when the resource 260 is unlocked, the serialization system 200 may share the updated resource 250 with the waiting threads 250. Sharing of the updated resource 250 may occur in various ways and may be implementation dependent. For example, in some embodiments, this sharing may occur by providing shared access to those threads 250 with shared enqueues. In some embodiments, the access manager 210 may instead notify the waiting threads 250 that the resource 260 is now available and up to date, thus welcoming access. In other embodiments, the access manager 210 may send out a broadcast indicating that the updated resource 260 is available, and the waiting threads 250 may be configured to monitor the access manager 210 for such broadcasts.

By sharing the results of the first thread's work on the resource 260, the serialization system 200 may thus provide the previously waiting threads 250 with access to the resource 260 without the waiting threads 250 having to obtain exclusive access to and update the resource 260. Thus, in some embodiments, only a proper subset of exclusive access requests received for a resource 260 may be granted, as some threads 250 may accept shared access to resources 260 when those resources are being, or have been recently, updated. As a result, the serialization system 200 may avoid some circumstances where the resource 260 is updated repeatedly by different threads 250.

In some embodiments, the waiting threads 250 may be prevented from updating the resource 260 on exclusive bases in response to the exclusive access requests that put them on the list of waiting threads 250. Access to the shared updated resource 260 may be substituted for their requested exclusive access. In some other embodiments, however, the waiting threads 250 need not be prevented from obtaining exclusive access after the resource 260 is released; instead, each such thread 250 may make its own determination about whether they perform an additional resource update. If an additional update, and therefore exclusive access, is desired, a previously waiting thread 250 may once again request exclusive access.

In some embodiments, the serialization system 200 need not keep track of how old the resource 260 is, i.e., how long since its last update. In these embodiments, the associated resource data need not include the time of the most recent update. Instead, the serialization system 200 may allow the resource 260 to be updated by whichever thread 250 wins the race toward exclusive access, and may then share the resulting updated resource 260 with whichever threads 250 end up waiting for the resource 260 while the winning thread 250 has exclusive access. At a later time, if no threads 250 are awaiting the resource 260, the next thread 250 to request exclusive access may once again be allowed to update the resource 260. Thus, the age of the resource 260 need not be known or maintained.

In some other embodiments, however, exclusive access to a resource 260 may be further restricted by a time criterion, which may be specified by the resource data or which may be a default time criterion applicable to one or more resources 260. If a time criterion is used, the associated resource data may further include an age of the resource 260, which may be checked as needed by the access manager 210 or the threads 250. The time criterion may indicate that the resource 260 may be updated no more often than a specified frequency, or should be updated if the resource 260 is greater than a specified age when access is requested by a thread 250. Use of time criteria may be beneficial for resources 260 that are unlikely to require updating on a regular basis, or that are likely to change (and therefore benefit from updating) on a predictable schedule. In some further embodiments, a requesting thread 250 may check a resource's associated age before deciding whether to acquire exclusive access or to accept shared access. Alternatively, in embodiments where the access manager 210 solely determines the type of access provided to the requesting thread 250, the access manager 210 may check the resource's age before determining how to handle a request for exclusive or shared access to the resource 260.

A thread's level of awareness as to how its access requests are handled may be implementation dependent. For instance, threads 250 that do not obtain exclusive access, but are instead required to await the shared resource 260, may be unaware that they are receiving a shared result instead of having updated the resource 260 themselves. In such embodiments, the thread 250 may behave in a conventional manner, unaware of the serialization system's determination not to specifically lock and update the resource 260 according to that thread's request. In that case, the thread 250 may submit its request pertaining to the resource 260 and receive results as usual, without being notified that the results are provided due to sharing as a result of the resource 260 having been recently updated. In some other embodiments, however, threads 250 may control their own resource accesses. In other words, a thread 250 may determine whether it awaits the exclusive access it originally requested, or whether it accepts shared access instead.

Figure 3:
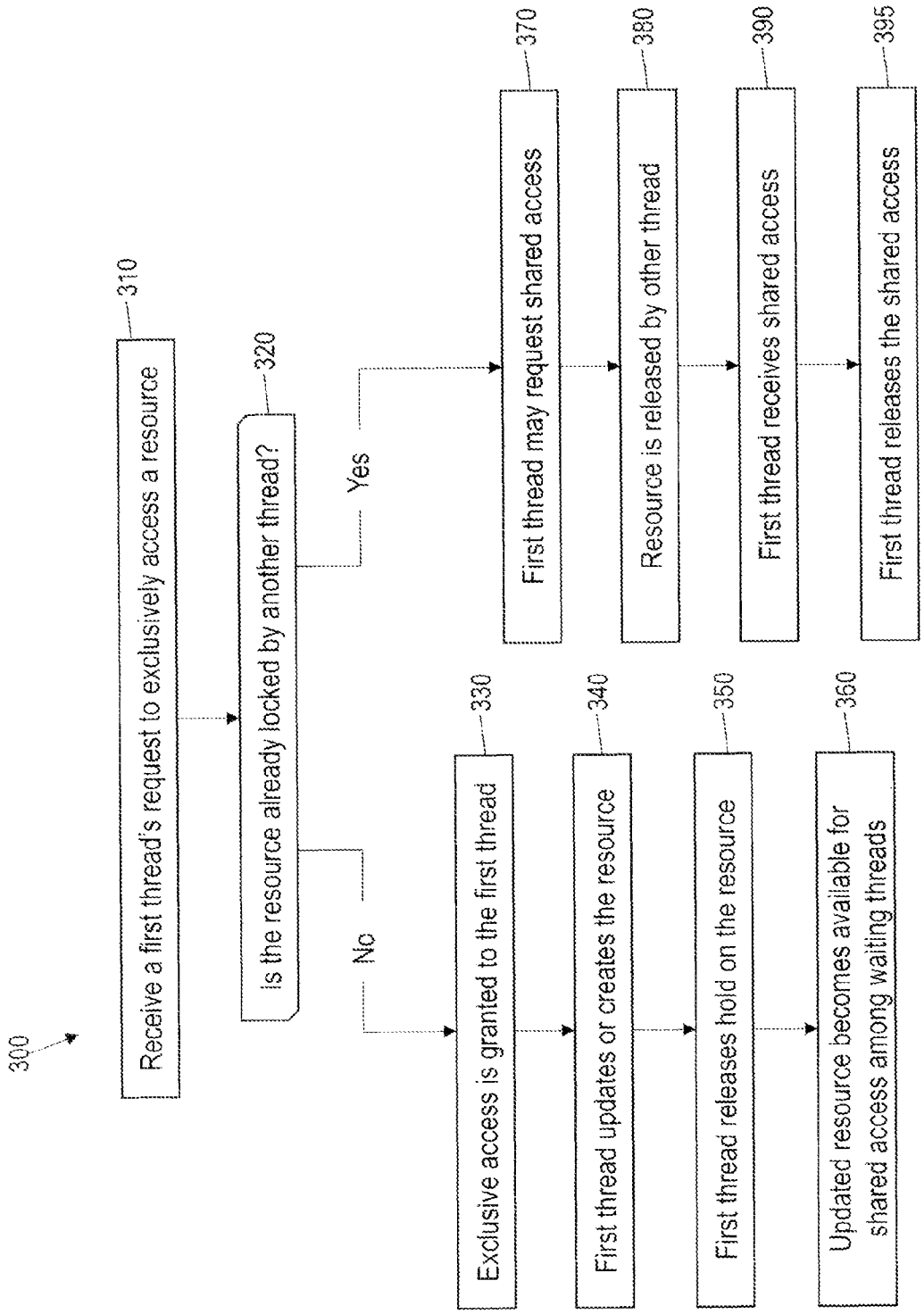
FIG. 3 is a flow diagram of a method for conditionally serializing access to a resource, according to some embodiments of this disclosure.

FIG. 3 is a flow diagram of a method 300 for conditionally serializing access to a resource 260, according to some embodiments of this disclosure. As shown, at block 310, a request for exclusive access to the resource 260 may be received from a first thread 250. This request may be "conditional." In other words, an indication may be returned to the thread 250 indicating whether the resource 260 is available, as opposed to automatically waiting for the requested exclusive access unconditionally. At decision block 320, it may be determined whether the resource 260 is already locked by another thread 250. At block 330, if the resource 260 is not yet locked, the first thread 250 may be granted exclusive access. In other words, the first thread 250 may receive exclusive access only conditionally, on the condition that the resource 260 is not already locked. At block 340, the first thread 250 may update or create the resource 260. At block 350, the first thread releases the exclusive hold on the resource 260. At that point, at block 360, the newly updated resource becomes available for shared access among threads that were waiting for access.

Back at decision block 320, if it is determined that the resource 260 is already held exclusively when the first thread's request is received, then at block 370, the first thread 250 may request shared access, indicating that it is willing to wait for access to the resource. This request for shared access may be "unconditional." In other words, the thread 250 making the request may indicate its willingness to wait for the shared access, and thus, the thread 250 would receive the shared access eventually regardless of current availability. Alternatively, however, the first thread 250 may opt to wait for exclusive access. At block 380, the resource 260 may be released by whichever thread had it locked at the time of the first thread's request for exclusive access. At block 390, the first thread 250 may receive shared access to the shared resource 260, along with other threads 250 awaiting that shared access. In other words, the shared result of the resource update may be provided unconditionally, regardless of whether the first thread 250 was able to receive exclusive access upon its initial request. At block 395, the first thread may release its shared access.

Accordingly, various embodiments of the serialization systems 200 and methods 300 may enable multiple threads 250 to share and update resources 260, without those resources 260 having to be updated in response to every single serialization request. As a result, the various threads 250, and the one or more computer systems 100 running them, may be saved some degree of work effort.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    requesting, by a first thread on a computer system, exclusive access to a first resource for updating the first resource to perform a first task, wherein the request for the exclusive access is conditional on the first resource not currently being held exclusively;
    receiving an indication of availability of the first resource; and
    executing, by a computer processor, one of a first action and a second action responsive to the indication, the executing comprising performing the first action if the indication indicates that the first resource is currently being held shared and performing the second action if the indication indicates that the first resource is being held exclusively;
    wherein the first action performed if the first resource is currently being held shared comprises waiting, by the first thread, until exclusive access to the first resource is available; and
    wherein the second action performed if the first resource is currently being held exclusively comprises:
        requesting, by the first thread, shared access to the first resource instead of the exclusive access to the first resource, responsive to the indication indicating that the first resource is being held exclusively;
        receiving the shared access to the first resource; and
        using the first resource to perform the first task through the shared access in lieu of the exclusive access.

2. The method of claim 1, wherein the first resource is exclusively held by a second thread when the exclusive access is requested, and wherein the first resource has been updated by the second thread when the shared access to the first resource is received.

3. The method of claim 1, wherein the shared access to the first resource is shared with one or more other threads that received indications that exclusive access to the first resource was unavailable.

4. The method of claim 1, wherein requesting the exclusive access to the first resource comprises acquiring an exclusive enqueue.

5. The method of claim 4, wherein requesting the shared access to the first resource comprises converting the exclusive enqueue to a shared enqueue.

6. The method of claim 4, wherein requesting the shared access to the first resource comprises releasing the exclusive enqueue and acquiring a shared enqueue.

7. A system comprising:
a first thread configured to request exclusive access to a first resource for updating the first resource to perform a first task, wherein the request for the exclusive access is conditional on the first resource not currently being held exclusively; and
an access manager configured to provide an indication of availability of the first resource;
wherein the first thread is further configured to:
execute, by a computer processor, one of a first action and a second action responsive to the indication, the executing comprising performing the first action if the indication indicates that the first resource is currently being held shared and performing the second action if the indication indicates that the first resource is being held exclusively;
wherein, to perform the first action responsive to the first resource currently being held shared, the first thread is further configured to wait until exclusive access to the first resource is available; and
wherein, to perform the second action responsive to the first resource currently being held exclusively, the first thread is further configured to:
request shared access to the first resource instead of the exclusive access to the first resource, responsive to the indication indicating that the first resource is being held exclusively;
receive the shared access to the first resource; and
use the first resource to perform the first task through the shared access in lieu of the exclusive access.

8. The system of claim 7, wherein the first resource is exclusively held by a second thread when the exclusive access is requested, and wherein the first resource has been updated by the second thread when the shared access to the first resource is received.

9. The system of claim 7, the first thread being configured to share the shared access to the first resource with one or more other threads that received indications that exclusive access to the first resource was unavailable.

10. The system of claim 7, the first thread being configured to request the exclusive access to the first resource by acquiring an exclusive enqueue.

11. The system of claim 10, the first thread being configured to request the shared access to the first resource by converting the exclusive enqueue to a shared enqueue.

12. The system of claim 10, the first thread being configured to request the shared access to the first resource by releasing the exclusive enqueue and acquiring a shared enqueue.

13. A computer program product comprising a non-transitory computer-readable storage medium having computer-readable program code embodied thereon, the computer readable program code executable by a processor to perform a method comprising:
requesting, by a first thread on a computer system, exclusive access to a first resource for updating the first resource to perform a first task, wherein the request for the exclusive access is conditional on the first resource not currently being held exclusively;
receiving an indication of availability of the first resource; and
executing one of a first action and a second action responsive to the indication, the executing comprising performing the first action if the indication indicates that the first resource is currently being held shared and performing the second action if the indication indicates that the first resource is being held exclusively;
wherein the first action performed if the first resource is currently being held shared comprises waiting, by the first thread, until exclusive access to the first resource is available; and
wherein the second action performed if the first resource is currently being held exclusively comprises:
requesting, by the first thread, shared access to the first resource instead of the exclusive access to the first resource, responsive to the indication indicating that the first resource is being held exclusively;
receiving the shared access to the first resource; and
using the first resource to perform the first task through the shared access in lieu of the exclusive access.

14. The computer program product of claim 13, wherein the first resource is exclusively held by a second thread when the exclusive access is requested, and wherein the first resource has been updated by the second thread when the shared access to the first resource is received.

15. The computer program product of claim 13, wherein the shared access to the first resource is shared with one or more other threads that received indications that exclusive access to the first resource was unavailable.

16. The computer program product of claim 13, wherein requesting the exclusive access to the first resource comprises acquiring an exclusive enqueue, and wherein requesting the shared access to the first resource comprises converting the exclusive enqueue to a shared enqueue.

17. The computer program product of claim 13, wherein requesting the exclusive access to the first resource comprises acquiring an exclusive enqueue, and wherein requesting the shared access to the first resource comprises releasing the exclusive enqueue and acquiring a shared enqueue.

* * * * *